United States Patent
Hallberg, Jr.

[11] Patent Number: 5,947,492
[45] Date of Patent: Sep. 7, 1999

[54] TRANSPORTABLE BAG CART

[76] Inventor: Gerald Hallberg, Jr., 1909 McArthur, Saginaw, Mich. 48603

[21] Appl. No.: 08/897,227

[22] Filed: Jul. 21, 1997

[51] Int. Cl.$^6$ .................................................. B62B 1/00
[52] U.S. Cl. .......................................... 280/47.24; 248/98
[58] Field of Search ............................. 248/98, 96, 129; 280/47.24, 654; D34/24

[56] References Cited

U.S. PATENT DOCUMENTS

| | | | |
|---|---|---|---|
| D. 157,589 | 3/1950 | Hartenbach | D34/24 |
| 3,041,026 | 6/1962 | Wilson | 248/98 |
| 3,870,261 | 3/1975 | McSwain | 248/101 |
| 3,992,034 | 11/1976 | Smith, Sr. et al. | 248/98 X |
| 4,179,132 | 12/1979 | Rich . | |
| 4,196,880 | 4/1980 | Hynes | 248/99 |
| 4,737,065 | 4/1988 | Ju | 280/47.24 X |
| 4,846,427 | 7/1989 | Jones | 248/95 |
| 4,974,799 | 12/1990 | Palmer | 248/95 |
| 5,033,703 | 7/1991 | Allen, Sr. | 248/97 |
| 5,377,941 | 1/1995 | Har et al. | 248/101 |
| 5,513,823 | 5/1996 | Bresnahan | 249/99 |
| 5,749,588 | 5/1998 | Stallbaumer | 280/47.27 |

*Primary Examiner*—Ramon O. Ramirez
*Attorney, Agent, or Firm*—John J. Swartz

[57] ABSTRACT

A transportable bag cart for a self-supporting bag having an upstanding sidewall with a closed lower end and an open upper end, including a lower bag support platform and an upper anti-collapse, open frame receivable within the open upper end of the bag. The open frame includes a pair of spaced apart side bars spanned by a forward base. Mechanism is provided for mounting the anti-collapse mechanism on an upper portion of the cart frame including a pair of laterally spaced apart inverted U-shaped mount members having forward upstanding legs which are integrally coupled to the side bars and receivable within the bag.

30 Claims, 3 Drawing Sheets

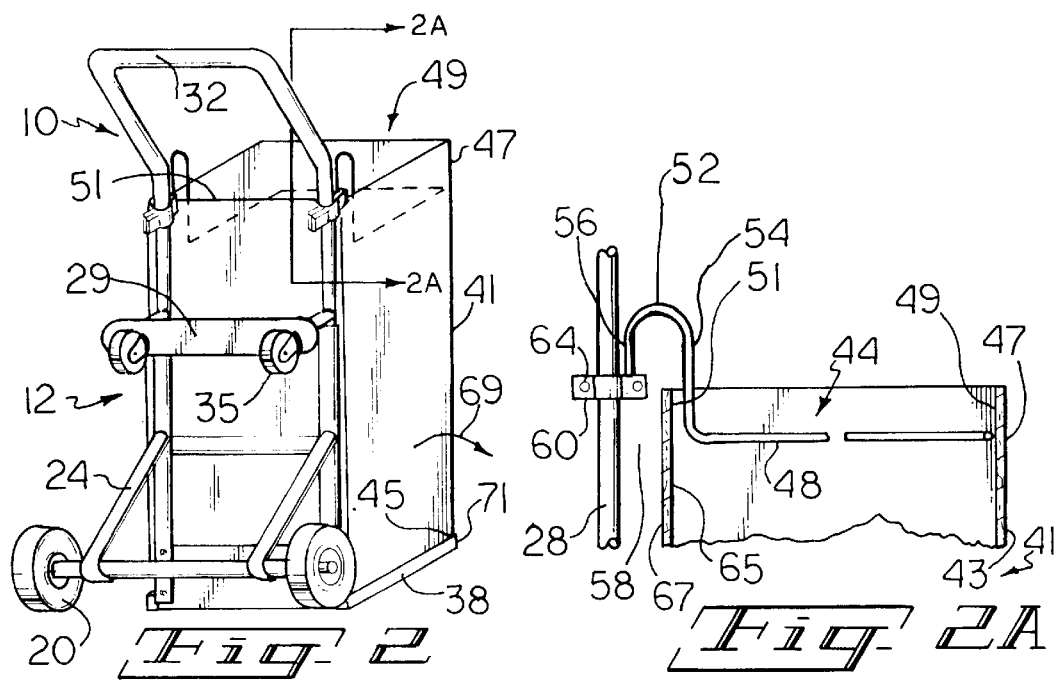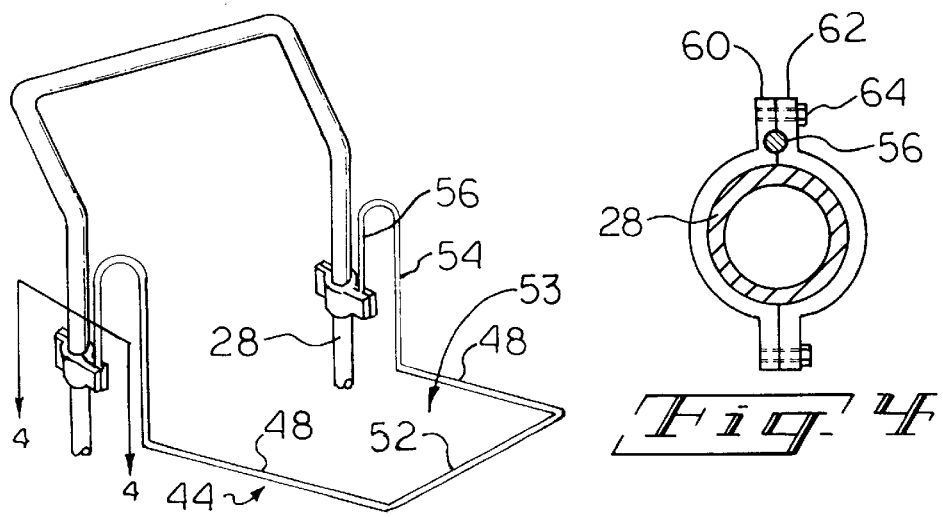

TRANSPORTABLE BAG CART

BACKGROUND OF THE INVENTION

1. Field of the Invention

This invention relates to a transportable bag cart for a refuse bag and, more particularly, to a transportable bag cart for stabilizing a self-supporting, upstanding bag having an upper open mouth to prevent the bag from tipping while preventing the open-mouth from closing.

2. Description of the Prior Art and Objects

Recently, some home owners have been required to deliver their grass and other refuse to refuse haulers in paper bags which, when opened, are of such thickness and weight so as to be self-supporting. The upper ends of such bags are upstanding and relatively stiff and not easily foldable around a frame.

Although the paper bags are relatively stiff, when empty, the bags easily blow over. Accordingly, it is an object of the present invention to provide apparatus for stabilizing an upright self-supporting bag, which is mounted on a transportable cart, to prevent the bag from tipping.

Even though the upstanding bag sidewall is self-supporting and vertically disposed, when the user dumps grass clipping and the like inside the bag, it frequently occurs that the outside surfaces of the upper end of the bag will be inadvertently knocked inwardly thereby causing the upper end to collapse inwardly and prevent an unimpeded flow of refuse into the bag.

Apparatus, such as that disclosed in U.S. Pat. No. 4,179,132, issued to Robert L. Rich on Dec. 18, 1979, has been provided heretofore for supporting flimsy plastic trash bags which are not self-supporting. In apparatus, such as that disclosed in U.S. Pat. No. 3,041,026 issued to E. F. Wilson on Jun. 26, 1962, the upper end of a flexible bag is wrapped around a collapsible frame. U.S. Pat. No. 4,846,427 issued to Hubert B. Jones on Jul. 11, 1989, discloses a forwardly opening bag support frame which internally receives a crop receiving sack that is impaled on the frame. U.S. Pat. No. 4,196,880, issued to Frederick B. W. Hynes on Apr. 8, 1980 and U.S. Pat. No. 5,513,823, issued to Jeremiah J. Bresnahan on May 7, 1996, disclose plastic bag holders which are only partially receivable within a bag and do not allow an upper end of a self-supporting bag to remain vertical about its perimeter. Accordingly, it is an object of the present invention to provide a transportable bag cart for transporting an upstanding bag and including an open frame which is disposable within the open-mouth of a self-supporting bag to hold the upper end of the bag open.

Various other bag holder constructions are illustrated in the following U.S. Patents:

| U.S. Pat. No. : | Patentee | Date of Issuance |
|---|---|---|
| 3,870,261 | McSwain | March 11, 1975 |
| 5,377,941 | Har et al | January 3, 1995 |
| 5,033,703 | Allen, Sr. | July 23, 1991 |
| 4,974,799 | Palmer | December 4, 1990 |

It is another object of the present invention to provide a transportable bag cart for a self-supporting bag which will allow the bag to remain upright while restraining tipping of the bag and while holding open the mouth of the bag.

It is another object of the present invention to provide apparatus for maintaining the mouth of a self-supporting bag open including an open frame which is receivable within the bag and mount mechanism for coupling the open frame to the bag cart including a vertical leg which extends into the bag and allows the upper side wall of the bag to remain upright.

It is a further object of the present invention to provide apparatus of the type described which includes anti-collapse mechanism having a U-shaped frame with a pair of lateral side bars mounting a front cross bar, disposable inside an upright bag, and a rear mount, coupled to the frame, including a pair of laterally spaced apart, U-shaped upright mount members defining downwardly opening slots for receiving an upper end portion of the bag sidewall.

A still further object of the present invention is to provide bag stabilizing apparatus of the type described including a U-shaped anti-collapse frame, disposable within a bag, with a closed front end, and a mount which is coupled to the frame outside the bag and includes a front depending leg, receivable within the bag, coupled to the anti-collapse frame.

It is yet another object of the present invention to provide bag stabilizing apparatus of the type described including a U-shaped anti-collapse frame which is closed at its front and, at its rear end, is mounted on a transportable bag cart frame via a pair of upstanding inverted U-shaped mount members which are integral with the anti-collapse frame.

It is still another object of the present invention to provide a bag holder of the type described including an inverted U-shape mount which defines a downwardly opening gap for receiving an upper, upstanding terminal portion of a bag that defines an opening for receiving refuse.

It is a further object of the present invention to provide apparatus of the type described including a one-piece frame having a rearwardly opening, U-shaped anti-collapse sub-frame disposable within an upper opening in a self-supporting bag and a pair of downwardly opening, upstanding U-shaped mount members having rear legs for coupling to a bag cart and front legs integrally coupled to rear ends of the anti-collapse frame.

It is another object of the present invention to provide a bag cart of the type described including a new and novel platform for supporting an upright bag.

It has been found that when the stiff upright paper bags have been filled, they can be relatively heavy and difficult to lift. Accordingly, it is another object of the present invention to provide a bag cart of the type described which will allow a bag to be supported during filling transported to a remote location and then easily deposited off the cart at the remote location without having to lift the bag.

Home owners frequently become inundated with various tools and equipment. The apparatus constructed according to the present invention is utilized to modify existing hand carts. Accordingly, it is the object of the present invention to provide apparatus for minimizing the number of tools and carts which a home owner need have to accomplish various object bag filling and transporting functions.

Other objects and advantages of the present invention will become apparent to those of ordinary skill in the art as the description thereof proceeds.

SUMMARY OF THE INVENTION

Apparatus for stabilizing an upstanding refuse bag mounted on an upstanding cart frame while allowing the sidewall of the bag to remain upright, including: anti-collapse mechanism, receivable within an open upper end of the bag for precluding the open upper end of a bag sidewall from inwardly collapsing comprising: a one piece frame having a closed front end and a rearwardly opening rear end, and mount mechanism for mounting the one-piece frame on a bag cart including a rear portion, adapted to be disposed outside the bag for coupling to the bag cart, and a front portion, adapted to be disposed inside the bag, integrally coupled to the rear end of the frame.

BRIEF DESCRIPTION OF THE DRAWINGS

The invention may be more readily understood by referring to the accompanying drawings, in which:

FIG. 2 is a slightly reduced rear perspective view of the transportable bag cart, illustrated in FIG. 1, illustrating a self-supporting paper bag mounted thereon;

FIG. 2A is a greatly enlarged sectional side view, taken along the line 2A—2A of FIG. 2, more particularly illustrating the stabilizing apparatus only disposed in a bag holding position with the anti-collapse frame disposed inside the open, upright upper end of a paper bag;

FIG. 3 is a greatly enlarged front perspective view illustrating only the upper portion of the bag cart frame mounting bag stabilizing apparatus constructed according to the present invention;

FIG. 4 is a further enlarged top plan sectional view of the cart frame, taken along the section line 4—4 of FIG. 3;

DESCRIPTION OF PREFERRED EMBODIMENT

Figure 1:
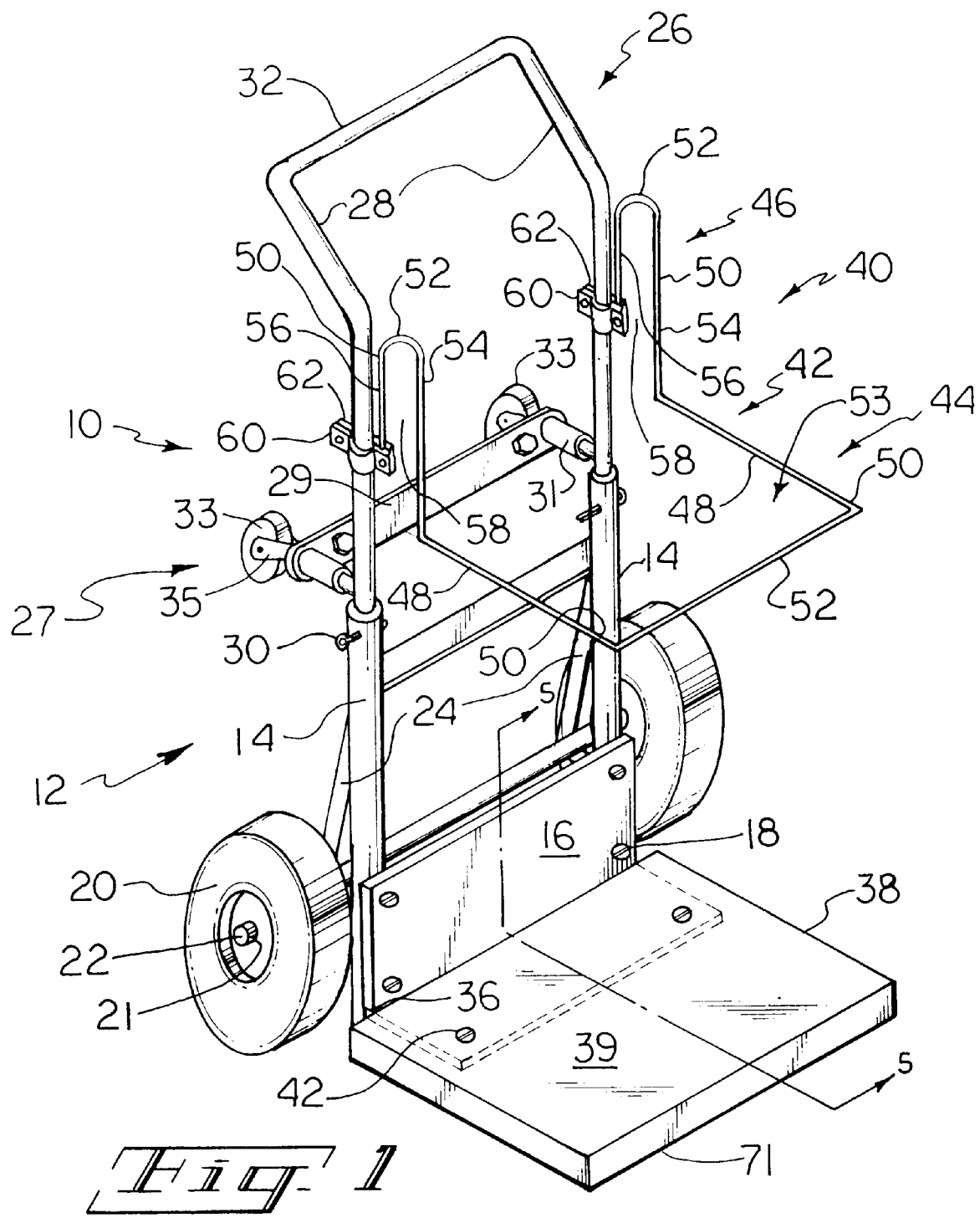
FIG. 1 is a front perspective view of a transportable bag cart constructed according to the present invention.
Figure 5:
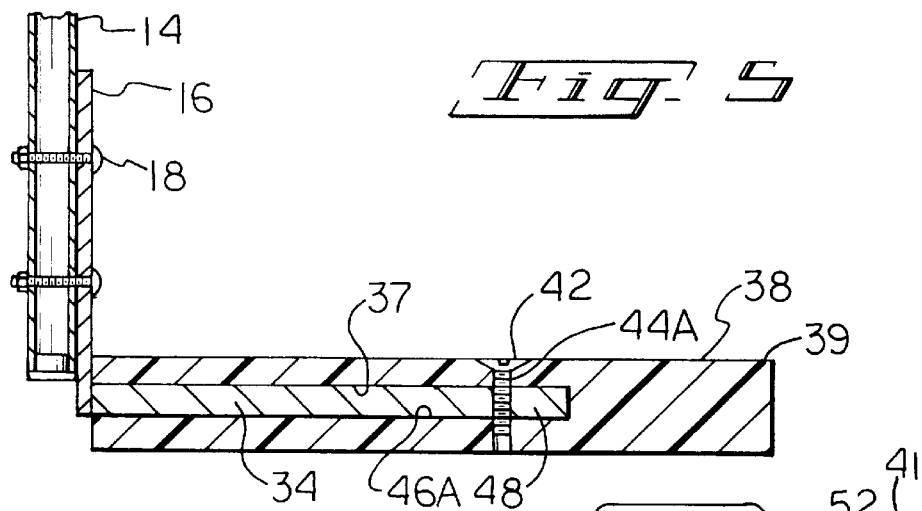
FIG. 5 is a further greatly enlarged sectional side view of the bag supporting platform, taken along the section line 5—5 of FIG. 1.

A bag cart constructed according to the present invention, generally designated 10, includes a frame, generally designated 12, including a lower pair of laterally spaced apart, upstanding tubular frame bars 14 mounted on the back side of an upstanding back plate 16 via bolt fasteners 18 or the like. The bag cart frame 12 is mounted for rolling movement on a surface to be traversed via wheels 20 journaled, by suitable bearings 21, on a shaft 22 which is fixed to a pair of rearwardly projecting laterally spaced apart braces 24 welded or otherwise suitably coupled, at their upper and lower ends, to the frame bars 14.

The cart frame 12 includes an upper frame 26 comprising an upper pair of laterally spaced apart, upstanding legs 28 which are telescopically received in the upstanding tubes 14 and coupled thereto, in any selected one of a plurality of different positions, via pins 30 which pass through selected ones of a plurality of vertically spaced openings provided in the tubes 14 and the bars 28. A handle 32 integrally spans the upper ends of the upper side bars 28.

The bag cart 10 includes a forwardly extending article support blade 34, which is welded or otherwise suitable fixed to the lower end 36 of the backer plate 16. A bag support platform, generally designated 38, is detachably mounted on the blade 34 for supporting an upstanding paper refuse bag, generally designated 41. The platform 38 includes a rearwardly opening slot or recess 37, which has a shape and configuration complemental to the shape and configuration, respectively, of the blade 34, so as to snugly, slidingly received thereby. The platform may suitably comprise injection molded plastic material or the like. The platform 38 extends forwardly of the frame bars 14 a distance sufficient to support paper bags 41 of varying widths and heights. If desired, bolts 42 may be disposed through opening 44A in the platform 38 and threadedly received in threaded openings 46A provided in the forward ends 48 of the blade 34.

An auxiliary, wheeled support subframe, generally designated 27, is mounted on the upstanding frame bars 28 for supporting the cart 10 if the cart frame 12 is pivoted about the rotational axis of the wheels 20 counterclockwise from the upright position illustrated in FIG. 1 to a horizontal position. The wheeled sub frame 27 includes a rearwardly disposed cross bar 29 mounted on the cart frame bars 28 via spacer posts 31. A pair of auxiliary wheels 33 are mounted on the cross bar 29 via swivels 35.

Bag stabilizing apparatus, constructed according to the present invention, generally designated 40, comprises a one piece frame, generally designated 42, including an anti-collapse, U-shaped sub frame, generally designated 44, and a mounting frame portion, generally designated 46. The anti-collapse U-shaped sub frame 44 includes a pair of laterally spaced apart side bars 48 having front ends 50 spanned by a cross bar 52. The side bars 48 and cross bar 52 define a vertical passage 53 for receiving and passing debris to be disposed inside the bag 41. The bag stabilizing apparatus 40, which may comprise steel wire, is provided for stabilizing a bag, generally designated 41, having an upstanding self-supporting sidewall 43 closed at its lower end by an integral bottom wall 45 and having an upper end 47 defining an upwardly opening mouth 49.

The mounting frame portion 46 includes a pair of laterally spaced apart inverted U-shaped rods 50 each having an upper base 52 integrally dependently mounting front and rear generally parallel legs 54 and 56, respectively, defining a downwardly opening slot or gap 58 for receiving the rear upper terminal end wall subportions 51 of the upper end 47 of the bag sidewall 43. The slot or gap 58 is of substantial vertical length to accommodate bags 41 having sidewalls 43 of differing heights. The front leg 54 is approximately twice the length of the rear leg.

The rear frame mounting legs 56 are each detachably coupled to opposite sides of one of the upper frame 28 via a pair of opposing clamp bars 60 and 62 (FIG. 4) coupled together via bolts 64 for mounting the anti-collapse frame 44 in any selected one of a plurality of vertically spaced positions. The lower end 63 of rear leg 56 is sandwiched between the clamp bars 60, 62 at a level substantially equidistant between the base 52 and the horizontally disposed frame bars 48.

ALTERNATE EMBODIMENT

Figure 6:
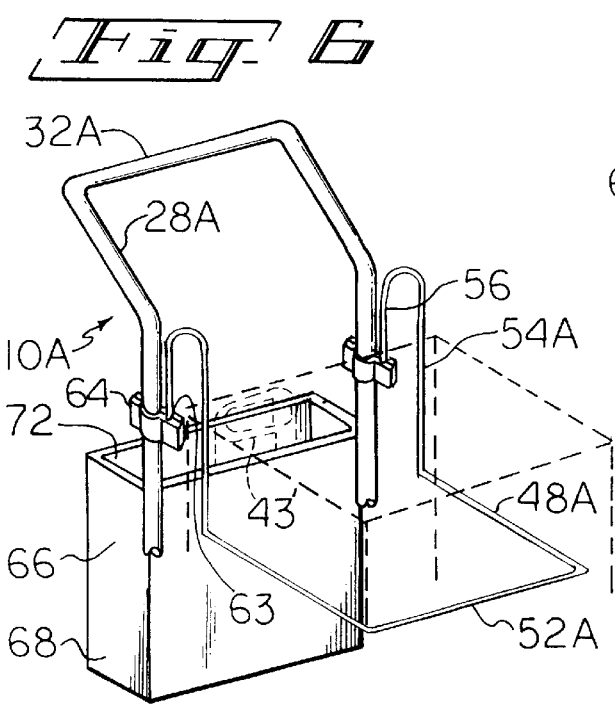
FIG. 6 is a front perspective view, similar to FIG. 3, illustrating only the upper portion of a slightly modified bag cart construction for an upstanding paper bag which is illustrated in phantom lines.
Figure 7:
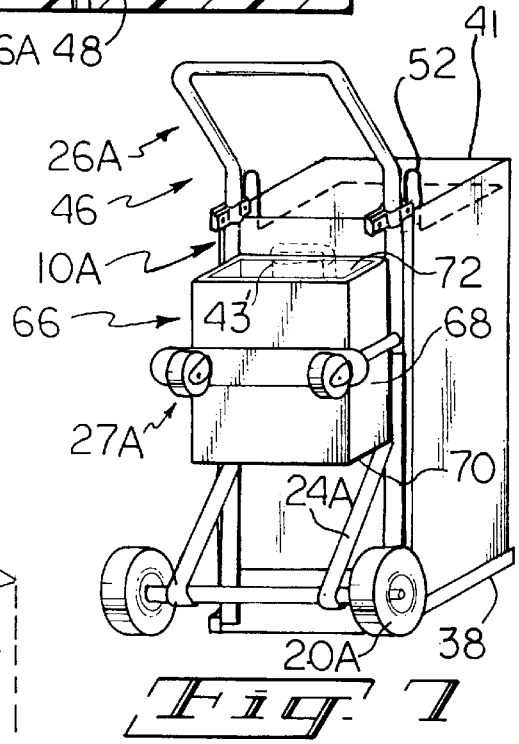
FIG. 7 is a slightly reduced rear perspective view of the modified embodiment illustrated in FIG. 6, but illustrating the paper bag in solid lines.

The embodiment illustrated in FIGS. 6 and 7 is generally similar to that illustrated in FIGS. 1–5 and generally similar parts will be referred to by generally similar reference numerals followed by the letter A subscript. The cart, generally designated 10A, includes a slightly modified auxiliary wheeled framed 27A and includes an upwardly opening, paper bag storage container, generally designated 66, for storing a plurality of folded paper bags schematically designated 43'. The container 66 has a sidewall 68 closed by a bottom wall 70 and is open at its top 72 for receiving and storing a plurality of folded paper bags 43' prior to use.

THE OPERATION

A bag 43 is unfolded, opened and moved to the position illustrated in FIG. 2 wherein the bottom bag wall 45 is supported by the platform 38 and the upper rear wall terminal sub portions 51 are freely received in the downwardly opening slots 58 between the mounting legs 54 and 56. The anti-collapse, U-shaped frame 44 is thus disposed inside the bag 43 to prevent the upstanding upper end portion 47 of the upstanding sidewall 43 from collapsing inwardly.

The mounting legs 54 and 56 extend alongside the inner and outer bag surfaces 65 and 67, respectively, to stabilize the bag 41 and prevent it from tipping, particularly from a strong wind gust when the bag 41 is not yet filled with sufficient debris to anchor the bag on the platform 38.

The anti-collapse frame 44 will keep the mouth 49 open. If the user inadvertently strikes the outside bag surface 67 as debris is being deposited through the opening in the anti-collapse frame 44, the frame 44 will bear outwardly against the inside bag surface 65 to maintain the upper end 47 upright.

The bag 41, when adequately filled and supported via the platform 38, can be transported to a suitable dumping location where the cart 10 can be tipped clockwise, in the direction of the arrow 69, about the front edge 71 of the platform 38. The debris filled bag 41 supported thereon will slide forwardly on upper surface 39 of the platform 38 onto the ground and the upper bag ends 47 will escape the slots 58. Also, if desired, the lower end of the bag 41 can be forwardly moved to a position forwardly of the platform 38. Thereafter, the top of the bag 41 is moved forwardly or if desired, the cart 10 can be rearwardly moved to clear the bag. The filled bag can thus be transported and deposited without hving to lift the bag.

A new bag can be mounted on the platform 38 in the position illustrated in FIG. 2 and the process repeated.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. A transportable bag holder for an upright bag including a self-supporting, upstanding sidewall having inner and outer sides, a lower closed end, and an upper open end defining an upper opening, said upper open end including front and rear upstanding terminal wall portions, said bag holder comprising:

an upstanding cart frame having upper and lower frame portions;

means mounting said upstanding cart frame for transitional movement along a surface to be transversed;

a forwardly extending bag support platform, mounted on said lower portion of said cart frame, for receiving said closed lower end of said bag and vertically supporting said bag thereon; and stabilizing means for precluding inadvertent tipping of said upright bag including anti-collapsing means receivable by said upper open end for preventing said upper open end from inwardly collapsing while allowing said sidewall to remain upstanding; and mount means, mounted on said upper frame portion, for mounting said anti-collapsing means in spaced relation with said upper frame portion to define a gap between said anti-collapsing means and said upper frame portion for receiving said rear upstanding terminal wall portion of said upper open end of said bag;

said mount means comprising an inverted U-shaped member defining a downwardly opening slot which receives said rear upstanding terminal wall portion of said upper end of said bag.

2. A transportable bag holder for holding a bag including a vertically disposed upstanding sidewall having inner and outer sides and an upper upstanding portion defining an upper open end, and a bottom wall closing a lower end of said sidewall, said bag holder comprising:

a hand cart including a frame having an upper end provided with a handle and a lower end, a pair of ground engageable wheels mounted on said lower end of said frame for rotation about an axis, a bag support platform mounted on, and extending forwardly of, said lower end of said frame for supporting said closed lower end of said bag, bag stabilizing means mounted on said upper end of said frame for laterally stabilizing said upper end of said bag while allowing said upper portion of said sidewall to remain vertically disposed and maintain said upper end open including anti-collapsing frame means for preventing said open upper end of said sidewall from inwardly collapsing, said anti-collapsing frame means being, receivable within said upper open end and including an opening therethrough for receiving and vertically passing objects to be disposed with said bag; and mount means, coupled to said upper end of said frame and extending forwardly and downwardly relative to said upper end of said frame, including a lower forward end, adapted to be received in said bag, integrally coupled to said anti-collapsing frame means.

3. Apparatus for stabilizing a bag including a self supporting, upstanding sidewall having an open upper end and a closed lower end supported by a bag support platform mounted forwardly of a lower end of an upstanding transportable cart frame, said apparatus comprising:

anti-collapsing means, receivable within said open upper end, for precluding said open upper end of said upstanding sidewall from inwardly collapsing comprising an open one-piece frame having a passage therethrough for receiving and passing objects to be disposed in said bag including a pair of laterally spaced apart elongate side bars each having front and rear ends, a forward base spanning said front ends of said side bars; and mount means for mounting said anti-collapsing means on an upper portion of said upstanding transportable cart including a rear portion for coupling to said upper portion of said upstanding transportable cart and an upstanding forward end portion having a lower end, receivable in said bag, coupled to said rear ends of said side bars.

4. The apparatus set forth in claim 3 wherein said mount means has an inverted U-shape and is integral with said rear ends of said side bars.

5. The apparatus set forth in claim 3 wherein said mount means comprises a pair of laterally spaced apart, inverted U-shaped rods integrally coupled to said side bars.

6. The apparatus set forth in claim 3 wherein said mount means comprises a pair of laterally spaced apart, upstanding, U-shaped rods each having an upper base and front and rear spaced apart legs depending from opposite ends of said base defining a gap for receiving said upper end of said upstanding sidewall, said front legs each having a lower end integrally coupled to said rear end of said side bars.

7. The apparatus set forth in claim 6 wherein said front leg has a length approximately twice the length of said rear leg.

8. The apparatus set forth in claim 7 wherein said rear leg has a lower terminal end disposed at a level substantially equidistant between the level of said upper base and the level of said elongate side bars.

9. A transportable bag holder for an upright bag including a self-supporting, upstanding sidewall having inner and outer sides, a lower closed end, and an upper open end defining an upper opening, said upper open end including front and rear upstanding terminal wall portions, said bag holder comprising:

an upstanding cart frame having upper and lower frame portions;

means mounting said upstanding cart frame for transitional movement along a surface to be transversed;

a forwardly extending bag support platform, mounted on said lower portion of said cart frame, for receiving said closed lower end of said bag and vertically supporting said bag thereon; and stabilizing means for precluding inadvertent tipping of said upright bag including
  anti-collapsing means receivable by said upper open end for preventing said upper open end from inwardly collapsing while allowing said sidewall to remain upstanding;
  mount means, mounted on said upper frame portion, for mounting said anti-collapsing means in spaced relation with said upper frame portion to define a gap between said anti-collapsing means and said upper frame portion for receiving said rear upstanding terminal wall portion of said upper open end of said bag; and means detachably mounting said support platform on said lower portion of said frame comprising means, coupled to said cart frame, telescopingly receiving a portion of said platform;

said means telescopingly receiving comprises an elongate blade of a predetermined shape extending transverse to said upstanding cart frame, and said platform includes an elongate recess having a shape complemental to said predetermined shape of said blade for frictionally, detachably receiving said blade.

10. A transportable bag holder for a bag including a self-supporting upstanding sidewall having inner and outer sides, a lower closed end and an upper end portion, having front and rear upstanding terminal wall subportions, defining an upper open end, said holder comprising:

an upstanding cart frame;

means mounting said cart frame for transitional movement along a surface to be transversed;

a forwardly extending bag support platform mounted on a lower portion of said cart frame for receiving said closed lower end of said bag and vertically supporting said bag thereon; and one-piece stabilizing rod means for precluding inadvertent tipping of said bag and for preventing said upper end portion from inwardly collapsing while allowing said sidewall to remain upstanding comprising a one piece rod having
  a generally horizontally disposed, U-shaped, anti-collapsing member, receivable in said bag, including
    a horizontal base member, and
    a pair of horizontally disposed laterally spaced apart legs each having a front end coupled to said base member and a rear end; and
  a pair of generally vertically disposed, inverted U-shaped mount members each having
    a front leg, receivable with said upper open end, provided with a lower end integrally coupled to said rear end of one of said horizontally disposed legs; and
    a rear leg spaced from said front leg by a gap for receiving said rear upstanding terminal end subportion of said upper portion of said bag.

11. The transportable bag holder set forth in claim 10 including means detachably mounting said platform on said lower portion of said frame.

12. The transportable bag holder set forth in claim 11 wherein said platform comprises a generally planar bag support member, said means detachably mounting said platform comprises a generally planar, elongate blade, and an elongate recess in said bag support member for frictionally, detachably receiving said blade.

13. The transportable bag holder set forth in claim 10 including means detachably mounting said inverted U-shaped mount members on said cart frame in any selected one of a plurality of different vertically spaced positions.

14. A transportable bag cart for an upright bag having an upstanding sidewall with inner and outer sides, a closed lower end, and an open upper mouth end, said bag cart comprising:

an upstanding support member having upper and lower end portions;

forwardly extending bag support means for vertically supporting said bag, having a rear end coupled to said lower end portion of said support member, receiving and supporting a closed end of said bag;

stabilizing means for preventing inadvertent tipping of said bag and for preventing said open upper mouth end from closing comprising
  an open frame, receivable with said open upper mouth end, including
    laterally spaced apart bars having front and rear ends, and
    a forward base spanning said front ends of said laterally spaced bars; and
  mount means for mounting said open frame on said support member, including
    a rear portion, adapted to be disposed outside said bag, coupled to said upper portion of said upstanding support member, and
    a front portion, adapted to extend inside said sidewall, coupled to said rear ends of said laterally spaced bars.

15. The bag cart set forth in claim 14 wherein said mount means is integral with said rear ends of said laterally spaced bars frame.

16. The bag cart set forth in claim 14 wherein said frame is U-shaped and has a rearwardly opening, rear end opening between said rear ends of said laterally spaced apart bars and a front end closed by said base spanning said laterally spaced apart bars.

17. The bag cart set forth in claim 14 wherein said mount means comprises inverted U-shaped mount means defining a downwardly opening slot for receiving a portion of said open upper mouth end.

18. The bag cart set forth in claim 17 wherein said inverted U-shaped mount means comprises a pair of laterally spaced apart inverted U-shaped members each including an upstanding front leg, having a lower end coupled to said rear end of one of said laterally spaced apart bars, and an upstanding rear leg coupled to said upper end portion of said upstanding support member.

19. A transportable bag cart for a bag having a sidewall with inner and outer sides, a closed lower end, and an open upper mouth end, said bag cart comprising:

an upstanding support member having upper and lower end portions;

forwardly extending bag support means for vertically supporting said bag, having a rear end coupled to said lower end portion of said support member, receiving and supporting a closed end of said bag;

stabilizing means for preventing inadvertent tipping of said bag and for preventing said open upper mouth end from closing comprising
an open frame, receivable within said open upper mouth end, including
a closed front end, and
a rear end defining a rearwardly opening opening; and
mount means for mounting said open frame on said support member including
a rear portion, adapted to be disposed outside said bag, coupled to said upper portion of said support member, and
a front portion, adapted to be disposed inside said bag, coupled to said rear end of said open frame.

20. The bag cart set forth in claim 19 wherein said open frame comprises a U-shaped frame member having front and rear ends and said mount means comprises upstanding U-shaped means having front leg means coupled to said rear ends of said frame and rear leg means coupled to said upper portion of said upstanding support member.

21. The bag cart set forth in claim 19 wherein said open frame is U-shaped and includes a pair of laterally spaced apart bars having front and rear ends, and a forward base spanning said front ends of said laterally spaced apart bars; said mount means including a pair of laterally spaced apart inverted U-shaped members each having a rear leg coupled to said upper portion and a front leg integrally coupled to said rear end of one of said laterally spaced apart bars.

22. A transportable bag cart for an upright bag which includes a self supporting, upstanding sidewall having upper and lower ends and inner and outer surfaces, said lower end being closed by a bottom wall, said upper end being open and defining an upwardly opening mouth, said bag cart comprising:

an upstanding transportable support member having an upper end portion and a lower end portion;

forwardly extending bag support means mounted on said lower end portion receiving said bottom wall and vertically supporting said bag;

stabilizing means for laterally stabilizing said upper end of said bag and for maintaining said upper end open while allowing said sidewall to remain upstanding including
frame means, receivable within said open upper end, having front and rear ends and an opening therethrough for passing matter to be deposited into said bag, and mount means for mounting said frame means within said open upper end including a rear end portion coupled to said upper end portion of said upstanding support member, and an upstanding forward end portion having a lower end coupled to said rear end of said frame means.

23. The bag cart set forth in claim 22 wherein said mount means includes means for extending vertically along the inner and outer surfaces of said sidewall for laterally stabilizing said upper end of said bag and preclude said bag from tipping.

24. The bag cart set forth in claim 23 wherein said mount means has an inverted U-shape and includes an upper base and front and rear legs depending therefrom for passing along said inner and outer surfaces of said upper end of said sidewall.

25. The bag cart set forth in claim 24 wherein said frame means comprises a generally horizontally disposed, U-shaped member having a pair of laterally spaced apart frame bars, each having front and rear ends, and a front base member integrally coupled to said front ends of said frame bars; said mount means comprising a pair of upstanding, laterally spaced apart inverted U-shaped members each including a rear leg for coupling to said upper end portion of said transportable support member and a front leg having a lower end integrally coupled to said rear end of one of said laterally spaced apart bars.

26. The bag cart set forth in claim 25 wherein said bag support means comprises a forwardly extending blade, of a predetermined shape cantileverly mounted on said lower end of said frame, and a forwardly extending platform having an opening therein with a shape complemental to said predetermined shape, detachably receiving said blade.

27. A transportable bag holder for an upright bag including a self-supporting, upstanding sidewall having inner and outer sides, a lower closed end, and an upper open end defining an upper opening, said upper open end including front and rear upstanding terminal wall portions, said bag holder comprising:

an upstanding cart frame having upper and lower frame portions;

means mounting said upstanding cart frame for transitional movement along a surface to be transversed;

a forwardly extending bag support platform, mounted on said lower portion of said cart frame, for receiving said closed lower end of said bag and vertically supporting said bag thereon; and stabilizing means for precluding inadvertent tipping of said upright bag including
anti-collapsing means receivable by said upper open end for preventing said upper open end from inwardly collapsing while allowing said sidewall to remain upstanding; and
mount means, mounted on said upper frame portion, for mounting said anti-collapsing means in spaced relation with said upper frame portion to define a gap between said anti-collapsing means and said upper frame portion for receiving said rear upstanding terminal wall portion of said upper open end of said bag;

said anti-collapsing means comprising a generally horizontally disposed, U-shaped rod having a laterally extending front base adapted to be disposed adjacent said front upstanding terminal wall portion, and a pair of laterally spaced apart legs each having a front end coupled to said base and extending rearwardly from said base in a rearward direction toward said upper frame portion.

28. The transportable bag holder set forth in claim 27 wherein each of said legs includes a rear end; said mount means comprises a pair of generally upstanding rod members integrally coupled to said rear ends of said legs.

29. The transportable bag holder set forth in claim 28 wherein said upstanding rod members each have an inverted U-shape.

30. The transportable bag holder set forth in claim 27 wherein said legs include a rear end; said mount means comprises inverted U-shaped coupling means integrally coupled to said rear ends of said legs.

* * * * *